FIG. 2.

United States Patent Office 2,953,303
Patented Sept. 20, 1960

2,953,303

INTEGRATING SYSTEMS PARTICULARLY FOR USE IN POSITION-INDICATING NAVIGATION SYSTEMS

Hugh Brougham Sedgfield, London, England, assignor, by mesne assignments, to The Sperry Gyroscope Company, Limited, Brentford, England, a British company Filed Mar. 13, 1951, Ser. No. 215,221

7 Claims. (Cl. 235—187)

This invention relates to computing systems for effecting integration in moving axes and more particularly to navigation or position-plotting systems for computing the instantaneous position of a travelling object, hereinafter referred to as the moving craft, by doubly integrating measurements of acceleration effected on the craft. In such navigation systems it is generally desired to obtain the position of the moving craft as specified in some predetermined co-ordinate system. The earth's latitude and longitude system is the coordinate system in which it is usually required to do this. In other words the data that the computer is usually designed to compute are the instantaneous latitude $\theta$ and longitude $\phi$ of the craft.

Systems have been proposed in which latitude $\theta$ and longitude $\phi$ have been computed by using accelerometers to measure the components of acceleration in the north-south and east-west directions (the directions in which the latitude and longitude co-ordinates respectively vary most rapidly) and by directly integrating these measures to give quantities, which were taken to be the north-south and east-west velocities of the craft. These velocities were integrated again to give the craft's displacement from its starting point in the north-south and east-west directions, using, however, a correcting factor in the case of the east-west velocity equal to the secant of the latitude of the craft to allow for the more rapid change of longitude at higher latitudes for a given distance travelled in an east-west direction. In other words, the measure of east-west velocity was multiplied by a correcting factor equal to sec $\theta$ in order to convert it into the rate of change $\dot{\phi}$ of the longitude before it was integrated to give $\phi$.

The systems previously proposed have not been capable of operating with high accuracy, partly on account of accuracy limitations in the accelerometers used or in the means for keeping the accelerometers horizontal, partly on account of accuracy limitations in the integrators used, and partly because the basis on which the computers worked was theoretically incorrect.

The present invention is concerned with a navigation system or position-plotting system intended to compute the position of a craft with relatively high accuracy over relatively great distances of travel, and it is concerned more particularly with remedying the third of the above-mentioned defects of prior systems. Its object is thus to derive from the data provided by the accelerometers during travel of the craft the changes in the co-ordinates of the craft, using for this purpose computers that compute these changes in a theoretically more accurate manner than in the prior art.

The invention is based on the realisation that for the purpose of accurate computation the components of the craft's velocity in the direction of most rapid change of one of the coordinates of the reference system cannot be obtained by simple integration of the measure of the craft's acceleration in that direction that is provided by an accelerometer. In other words, if $\alpha_1$, $\alpha_2$, $\alpha_3$ are the component accelerations of the craft in mutually perpendicular co-ordinate directions and $v_1$, $v_2$, $v_3$ are the corresponding velocities, it is incorrect to compute the velocity components on the basis of the equations:

$$\left.\begin{aligned} v_1 &= \int_0^t \alpha_1 dt \\ v_2 &= \int_0^t \alpha_2 dt \\ v_3 &= \int_0^t \alpha_3 dt \end{aligned}\right\} \quad (A)$$

as has been done in prior art systems.

These equations are incorrect, as also are the converse equations $$\left.\begin{aligned} \alpha_1 &= dv_1/dt \\ \alpha_2 &= dv_2/dt \\ \alpha_3 &= dv_3/dt \end{aligned}\right\} \quad (B)$$

in spite of the fact that these equations merely appear to state that velocity is the time integral of acceleration, and that acceleration is the time derivative of velocity.

To make these considerations clear it is convenient to introduce the term "local co-ordinate axes" to refer to a reference system located at the position of the craft, and therefore moving with the craft over the earth's surface, having its axes directed, at each position of the craft, in the directions in which the several co-ordinates of the main co-ordinate system are changing most rapidly in the vicinity of that position. Thus, in the case of a latitude and longitude co-ordinate system, i.e. of a spherical-polar co-ordinate system, in which the co-ordinates of the craft's position are (1) the radial distance, $r$, of the craft from the earth's centre, (2) the longitude angle, $\phi$ and (3) the latitude angle, $\theta$, the local co-ordinate axes of the craft are directed: (1) vertically upwards (the direction in which $r$ is increasing most rapidly); (2) horizontally to the east (the direction in which $\phi$ is increasing most rapidly); and (3) horizontally to the north (the direction in which $\theta$ is increasing most rapidly). It will be noted that in this system the local co-ordinate axes are mutually perpendicular.

It will be supposed that the co-ordinate system in which the position of the craft is to be determined is of this kind, i.e. it will be supposed that at any point the directions in which the three co-ordinates change most rapidly in the vicinity of the point from their values at the point form a mutually perpendicular set. When the axes are orthogonal in this sense each of the local co-ordinate axes is not only the direction in which one of the co-ordinates varies most rapidly, but is also the direction along which a small displacement does not cause the other two co-ordinates to change at all. Thus, in a spherical polar co-ordinate system, a line of latitude, which is the direction in which to travel to produce the most rapid initial variation of longitude possible, is also the direction of travel in which no change occurs in $r$, the radial distance of the craft from the centre of the earth, nor in $\theta$, the latitude of the craft.

The error in the Equations A and B set out above arises from the fact that the three components of the craft's velocity that correspond respectively to changes in the three co-ordinates in which its position is to be expressed are not velocities parallel to a fixed set of Cartesian co-ordinates but are the velocities along the local co-ordinate axes (upwards, to the north, and to the east, in a spherical-polar co-ordinate system). The velocity components at one instant are thus measured along the local co-ordinates axes that pass through the position occupied by the craft at that instant, while the velocity components at a slightly later instant are the velocity components along the local co-ordinate axes that pass through the later position of the craft. The second set of velocity components differs from the first not only in respect of any change that may have occurred in the magnitudes of the respective velocity components, but also by virtue of the fact that each velocity component in the second set will be in a slightly different direction from the corresponding component in the first set. In other words, the velocity components are being turned in space as the craft travels as well as also possibly altering in magnitude. Each velocity component will give rise, through being turned as a result of turning of the local co-ordinate axes, to a velocity change in a direction perpendicular to that velocity component. The Equations A and B set out above, which represent the operation of the systems used in the prior art, take no account of these considerations. The system of the present invention, however, takes account not only of changes in the magnitudes of the component velocities along the local co-ordinate axes, as the craft travels, but also of changes in direction of these velocities due to turning of these local co-ordinate axes, as the craft travels. For this purpose it makes use of the formulae that have been established for rotating axes, viz.:

$$\left.\begin{array}{l}\alpha_1 = \dot{v}_1 + \omega_2 v_3 - \omega_3 v_2 \\ \alpha_2 = \dot{v}_2 + \omega_3 v_1 - \omega_1 v_3 \\ \alpha_3 = \dot{v}_3 + \omega_1 v_2 - \omega_2 v_1 \end{array}\right\} \quad (C)$$

where $\omega_1$, $\omega_2$, $\omega_3$ are the component angular velocities, or spins, of the local co-ordinate axes about their own directions due to travel of the craft, and $v_1$, $v_2$, and $v_3$ are the components of the velocity of the craft and therefore of the origin of the local co-ordinate axes in the directions of the local co-ordinate axes and relative to a point fixed in space instantaneously coinciding with the position of the craft. The apparatus of the invention operates according to these formulae for moving axes and the principle of the invention is most readily seen by expressing these equations in the form $$\left.\begin{array}{l}\dot{v}_1 = \alpha_1 - \omega_2 v_3 + \omega_3 v_2 \\ \dot{v}_2 = \alpha_2 - \omega_3 v_1 + \omega_1 v_3 \\ \dot{v}_3 = \alpha_3 - \omega_1 v_2 + \omega_2 v_1 \end{array}\right\} \quad (D)$$

The invention in one of its aspects consists in a navigation system for computing at least two of the components of the velocity of a moving craft in the directions of the axes of a local co-ordinate system located at the position of the craft, moving therewith and having its axes directed at each position of the craft in the directions in which the several co-ordinates of a predetermined main co-ordinate system fixed in the earth are changing most rapidly in the vicinity of that position, the said velocity components being computed from measures of the components of the acceleration of the craft in the said directions, wherein the measure of the component of the acceleration in at least one of the said directions is modified to provide a measure of the rate of change of the velocity component in the corresponding direction and this latter measure is then integrated to provide the desired measure of the velocity component, and wherein this modification of the measure of the component of acceleration is effected by subtracting from it at least one modifying quantity derived in such a manner as to correspond to the component of the acceleration in the said direction that is produced by turning of the direction of the said velocity component due to turning of the axes of the local co-ordinate system in space.

In another of its aspects the invention consists in a navigation system for computing at least two of the co-ordinates of the instantaneous position of a moving craft in a predetermined main co-ordinate system fixed in the earth from measures of the components of the acceleration of the craft along corresponding co-ordinate axes of a local co-ordinate system located at the position of the craft, moving therewith and having its axes directed at each position of the craft in the directions in which the several co-ordinates of the main co-ordinate system are changing most rapidly in the vicinity of that position, wherein, as a step toward computing the co-ordinates of the position of the craft the components of the velocity of the craft are computed from measures of the corresponding components of acceleration in the direction of the local co-ordinate axes wherein the measure of the component of the acceleration in at least one of the said directions is modified to provide a measure of the rate of change of the velocity component in the corresponding direction and this latter measure is then integrated to provide the desired measure of the velocity component, and wherein this modification of the measure of the component of acceleration is effected by subtracting from it at least one modifying quantity derived in such a manner as to correspond to the component of the acceleration in the said direction that is produced by turning of the direction of the said velocity component due to turning of the axes of the local co-ordinate system in space.

In yet another of its aspects the invention consists in apparatus for use in a navigation system according to the last paragraph or the last paragraph but one, comprising a plurality of accelerometers gyroscopically stabilised so that, if their operation were not modified by modifying quantities applied to them by extraneous devices, they would measure components of the acceleration of the craft along at least two of the local co-ordinate axes, a plurality of integrators for deriving measures of components of the craft's velocity from measures provided by the said accelerometers, and computing means for deriving and applying to the accelerometers modifying quantities corresponding to the components of the acceleration of the craft that are due to turning of components of the craft's velocity with turning of the local co-ordinate axes in space.

According to a feature of the present invention a component of the craft's velocity, e.g. $v_1$ in the direction of one of the local co-ordinates axes of the co-ordinate system but relative to a point fixed in space instantaneously coinciding with the position of the craft, is derived by an integrator from an input derived from a quantity measuring the corresponding component $\alpha_1$ of the craft's acceleration and from one or two modifying quantities such as $\omega_2 v_3$ and $\omega_3 v_2$, each of which is derived as a product of a measure of a component of the craft's velocity, e.g. $v_2$ or $v_3$, in the direction of another of the local co-ordinate axes but relative to a point fixed in space instantaneously coinciding with the position of the craft, and a measure of the component angular velocity, e.g. $\omega_3$ or $\omega_2$, of the local co-ordinate axes, due e.g. to travel of the craft, about the third local co-ordinate axis, so that the said input becomes a measure of the rate of change of the component velocity of the craft directed in the instantaneous direction of the local co-ordinate axes but relative to a point fixed in space instantaneously coinciding with the position of the craft. Generally, two such modifying quantities will be employed, except in circumstances where one of the quantities is systematically zero or negligible as, for example, where the craft remains on the surface of the sea, so that r is always zero.

Generally also, the system will employ two or three such accelerometers and integrators to generate measures of the velocity components relative to a point fixed in space in the directions of two or three of the local co-ordinate axes. Each measure of the velocity component in the direction of one of the local co-ordinate axes so generated, e.g. $v_1$, may then be used in the computation of a correcting quantity, e.g. $\omega_3 v_1$, for the accelerometer provided for measuring the acceleration, e.g. $\alpha_2$, in the direction of another of the local co-ordinate axes. For this purpose the measure of velocity, e.g. $v_1$, is applied to a device adapted to compute the product with it of a measure of a component, e.g. $\omega_3$, of the angular velocity or spin of the local co-ordinate axes about the third axis, thereby to generate one of the modifying terms to be applied to modify the measure of acceleration provided by the accelerometer. The measures of angular velocity $\omega_1$, $\omega_2$, $\omega_3$, of the local co-ordinate axes about the instantaneous position of the axes that are used in this computation may themselves be derived by computers that compute them from the generated measures $v_1$, $v_2$, $v_3$, of the velocity components relative to space axes in the directions of the local axes.

In particular the invention is applicable to and is realised in a system in which the main co-ordinate system is a spherical co-ordinate system having its origin at the centre of the earth and in which the position of a point is expressed by the three co-ordinates, $r$, $\phi$, and $\theta$, where $r$ is the radius from the center of the earth to the point, $\phi$ is the longitude of the point, and $\theta$ is its latitude.

One such system and apparatus for use therein will now be described with reference to the accompanying drawings in which.

Figure 1:
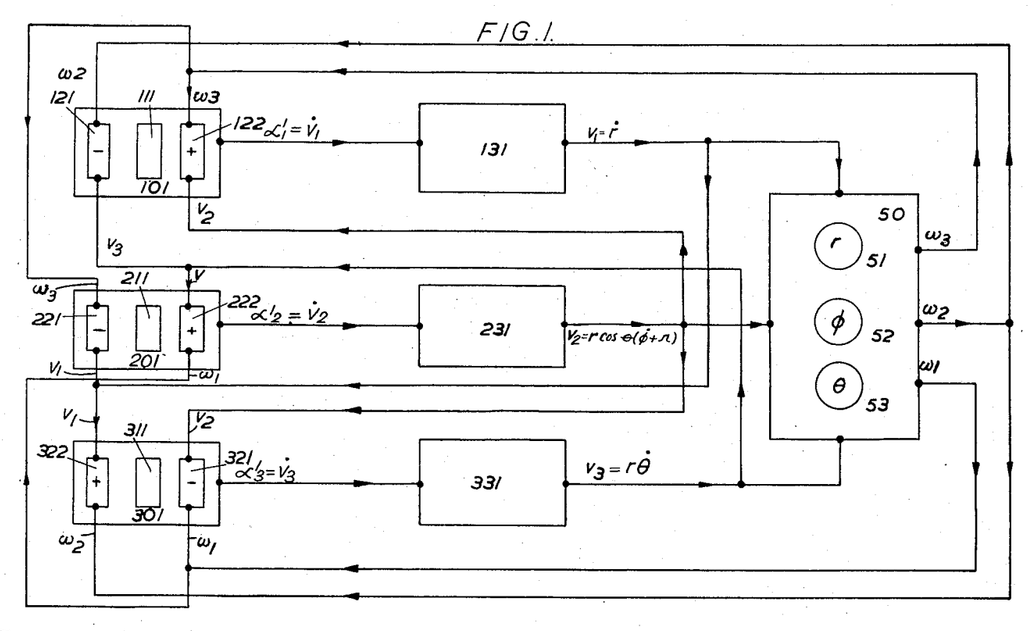
Fig. 1 is a block diagram illustrating the general principles of the invention.

Referring to Fig. 1, three accelerometers 101, 201, 301 are used gyroscopically stabilised in directions such, that if they were not subjected to correcting forces applied to them by extraneous devices, they respectively would measure the acceleration components $\alpha_1$, $\alpha_2$, $\alpha_3$, along directions directed respectively vertically upwards, horizontally to the east, and horizontally to the north, at the point on the earth's surface where the craft is actually situated, said directions forming local co-ordinate axes associated with a main spherical polar co-ordinate system having its origin at the centre of the earth and in which the position of a point is expressed by the three co-ordinates, $r$, $\phi$, and $\theta$, where $r$ is the radius from the centre of the earth to the point, $\phi$ is the longitude of the point, and $\theta$ is its latitude.

The method by which the accelerometers are gyroscopically stabilised is described more fully in co-pending U.S. application Serial No. 225,937 and is not part of the present invention per se, which is concerned with solving the problem of integrating the outputs of the accelerometers supposed to be maintained in the correct relationships to the local co-ordinate axes. However, it may be useful to point out here that gyroscopes controlled from pendulous devices by conventional methods will not be satisfactory for the purpose of stabilising the accelerometers, because the pendulous devices will be affected by the accelerations of the craft and will produce errors in the gyroscopes and therefore in the outputs of the accelerometers. In fact the reference system by which the accelerometers are stabilised must itself be determined in part by the output of the integrating system of the invention. One type of gyroscope which makes use of an effect known as "Schuler tuning" may be employed in apparatus which operates in accordance with the present invention because such a gyroscope is not subject to the acceleration errors usually associated with conventional pendulous devices. The theoretical basis and operation of Schuler tuned navigational instruments has been described in considerable detail in a number of patents and publications, one of which is an article written by Walter Wrigley, Assistant Director of the Instrumentation Laboratory of the Massachusetts Institute of Technology, which appeared in the December 1950 issue of the publication "Navigation," volume II, No. 8, beginning at page 282. A pendulous gyroscope which is arranged and designed to have a natural period of oscillation in the earth's gravity field of 84.4 minutes fulfills the condition of Schuler tuning with the result that acceleration errors due to pendulosity are virtually eliminated.

Moreover, in contrast to a space stabilized vertical reference, this type of gyroscope defines a vertical which has its origin at the center of the earth and therefore is always coincident with the vertical of the local coordinate axes. Having thus defined the vertical, a plane normal to it may be established to fix the horizontal of the local coordinate axes and the north-south and east-west local coordinate axes will lie in that horizontal plane. A Schuler tuned gyroscope borne by a moving craft will define a reference which is progressively reoriented as the craft pursues its course, and the reference established by such a gyroscope is constantly and continuously directed so that it is always coincident with the local coordinate axes to provide the requisite environment for the practice of the present invention.

Still another alternative is possible by the use, for example, of a fixed-direction reference system defining fixed directions in space which may be continuously corrected from the output of the integrating system of the invention so that it defines the directions in space of the local vertical and local east and north at the position of the craft, and the accelerometers may be maintained in these directions.

The accelerometers 101, 201 and 301 are each subjected to the action of two modifying quantities derived in a manner that will be explained in more detail hereinafter with reference to Figs. 2 and 3, so that their outputs are not measures of the acceleration components $\alpha_1$, $\alpha_2$, $\alpha_3$, but of modified acceleration quantities $\alpha_1'$, $\alpha_2'$, $\alpha_3'$. The modifying quantities applied to modify the outputs of the several accelerometers are intended to be respectively proportional to:

Accelerometer 101 _______________________ $-\omega_2 v_3 + \omega_3 v_2$
Accelerometer 201 _______________________ $-\omega_3 v_1 + \omega_1 v_3$
Accelerometer 301 _______________________ $-\omega_1 v_2 + \omega_2 v_1$ so that $\alpha_1'$, $\alpha_2'$, $\alpha_3'$ should be obtained substantially in accordance with the equations:

$$\alpha_1' = \alpha_1 - \omega_2 v_3 + \omega_3 v_2$$
$$\alpha_2' = \alpha_2 - \omega_3 v_1 + \omega_1 v_3$$
$$\alpha_3' = \alpha_3 - \omega_1 v_2 + \omega_2 v_1$$

which, by equations D, makes $\alpha_1'$, $\alpha_2'$, $\alpha_3'$ substantially equal to $\dot{v}_1$, $\dot{v}_2$, $\dot{v}_3$. The modified quantities $\alpha_1' = \dot{v}_1$, $\alpha_2' = \dot{v}_2$ and $\alpha_3' = \dot{v}_3$ are applied respectively to integrating devices 131, 231 and 331. It follows that, if the integrating devices operate to give outputs substantially proportional to $\int \alpha_1' dt$, $\int \alpha_2' dt$, $\int \alpha_3' dt$, these outputs will be substantially proportional to $v_1$, $v_2$, $v_3$.

In the case of the main co-ordinate system considered, these velocities would be the component velocities of the craft in the directions of the local co-ordinate axes, i.e. upwards, horizontally to the east, and horizontally to the north respectively, relative to a point fixed in space at the instantaneous position of the craft. These velocities may be expressed in terms of the co-ordinates $r$, $\phi$, $\theta$ and of the angular velocity $\Omega$ of the earth about its axes by the equations $$\left. \begin{array}{l} v_1 = \dot{r} \\ v_2 = r \cdot \cos\theta (\dot{\phi} + \Omega) \\ v_3 = r\dot{\theta} \end{array} \right\} \quad (E)$$

In the embodiment of the invention the modified acceleration quantities $\alpha_1'$, $\alpha_2'$, $\alpha_3'$ are obtained from the outputs of the accelerometers 101, 201, 301, as D.C. voltages. These voltages are applied to the input circuits of integrating amplifiers in the form of high-gain D.C. amplifiers 131, 231, 331, provided with negative capacitive feed-back. Such amplifiers are now well-known but the accuracy of the present system is best maintained if the amplifiers are compensated against the occurrence of drift effects, e.g. in the manner disclosed in co-pending U.S. patent application, Ser. No. 130,328, now Patent No. 2,730,573.

The three quantities measuring respectively $v_1$, $v_2$ and $v_3$ are fed into the computer 50 in which the co-ordinates $r$, $\phi$ and $\theta$ are derived from the measures of the component velocities. It is clear that the first co-ordinate $r$ may be derived from the first component velocity $v_1$ by directly integrating it. In the particular case, if it is desired that the indicator 51 should show the height of the craft above the earth's surface rather than the radius from the centre of the earth to the craft, it is necessary to set the indicator 51 initially so that it reads the height of the craft at the time at which the apparatus is set in motion. Similarly $\phi$ and $\theta$ may be derived from $v_2$ and $v_3$ respectively by integration. However, before integrating $v_2$ and $v_3$ it is necessary to apply correcting factors $r \cos \theta$ and $r$ in order that the integrators should compute $\int (v_2/r \cos \theta) dt$ and $\int (v_3/r) dt$ respectively instead of $\int v_2 dt$ and $\int v_3 dt$. Further in the particular case, since indicator 52 will be required to measure the longitude of the position of the craft, the quantity $v_2$ before being integrated must first be modified to allow for the presence of the term $r.\cos \theta.\Omega$ in the input, since the indication required is relative to the earth. However, the quantity $v_2$ which is fed back to the correcting devices in accelerometers 101 and 301 must be as defined above, i.e. in the east-west direction relative to a point fixed in space at the instantaneous position of the craft. Therefore arrangements must be provided for feeding this quantity directly from the output of integrator 231 back to the accelerometers.

In addition to deriving the co-ordinates, $r$, $\phi$ and $\theta$ and, where necessary, modifying the input velocity quantities so as to provide output velocity quantities equal to $v_1$, $v_2$ and $v_3$, computer 50 is also designed to derive quantities measuring the spin components $\omega_1$, $\omega_2$ and $\omega_3$, which are the component angular velocities of the local co-ordinate axes about their own respective directions due to travel of the craft. In the particular case the spin components $\omega_1$, $\omega_2$ and $\omega_3$ may be expressed in terms of the co-ordinates $r$, $\phi$ and $\theta$ by the equations $$\left. \begin{array}{l} \omega_1 = \sin \theta (\dot{\phi} + \Omega) \\ \omega_2 = \cos \theta (\dot{\phi} + \Omega) \\ \omega_3 = -\dot{\theta} \end{array} \right\} \quad \text{(F)}$$

Figure 2:
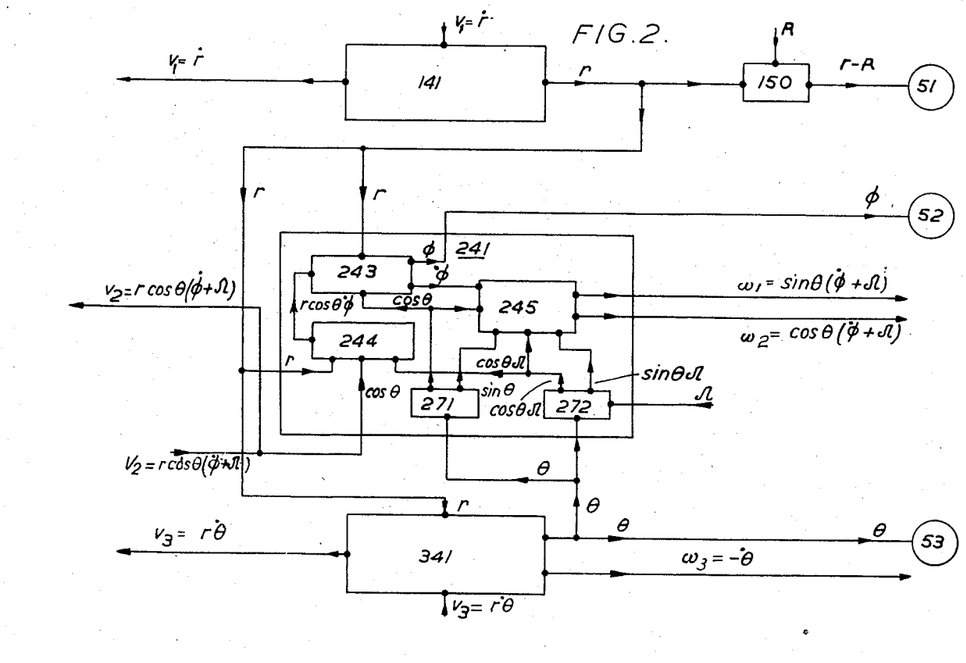
Fig. 2 is a more specific block diagram of a computer used in apparatus according to the invention.

In Fig. 2 there is shown a block diagram of one form of computer 50 suitable for use in the system shown in Fig. 1. This computer is intended for the particular case described above in which the quantities fed in are $v_1$, $v_2$ and $v_3$. It provides indications of the three co-ordinates of the craft's position in the main co-ordinate system $r$ (or preferably, as shown, $r-R$, when R is the radius of the earth and consequently $r-R$ is the height of the craft) $\phi$ and $\theta$, and derives the three spin components $\omega_1$, $\omega_2$, $\omega_3$ for application to the accelerometers.

The quantity representing the velocity $v_1$, which may be in the form of the rotation of a shaft or in the form of an electrical voltage or current, is fed to an integrating device 141. The output of this device, which again may be in the form of an electrical voltage or current or the rotation of a shaft, is fed to a computing device 150 into which is also fed a constant R representing the radius of the earth. This computing device 150 operates to provide an output $r-R$ which indicates the height of the craft above the earth's surface. This output is arranged to operate an indicator 51. The output of the integrator 141 which measures $r$ is also used to operate correcting devices in integrating devices 241 and 341. In addition, the quantity $v_1$ is taken directly from the input to be fed back to accelerometers 201 and 301.

The quantity proportional to $r\dot{\theta}$ from integrator 331 is fed to an integrating device 341 which, instead of integrating this quantity directly, utilises the output, $r$, of device 141 to modify the operation of the integrator so that in effect it integrates $\dot{\theta}$ to produce an output giving an indication of the latitude $\theta$ of the craft. This output may conveniently be in the form of the rotation of a shaft which operates indicator 53 and is also utilised to operate correcting devices in integrating device 241. The integrating device 341 in addition to producing an output proportional to the integral of $\dot{\theta}$, produces a further output quantity proportional to $-\dot{\theta}$ which is used as the output quantity measuring $\omega_3$ for application to the correcting devices in accelerometers 101 and 301. In addition the output measuring $v_3$ for accelerometers 101 and 201 is derived directly from the input.

The quantity proportional to $r.\cos \theta(\dot{\phi}+\Omega)$ from integrator 231 is fed to an integrating device 241, the operation of which is described in more detail hereinafter with reference to Fig. 3. In this device the input quantity measuring $r.\cos \theta(\dot{\phi}+\Omega)$ is first fed to a computer 244 which operates to provide an output quantity measuring $r.\cos \theta.\dot{\phi}$. To do this computer 244 utilises the output measuring $r$ from integrating device 141 and also the output measuring $\cos \theta.\Omega$ from a computer 272 controlled by a quantity proportional to $\theta$ provided by integrator 341. The output of computer 244, providing a measure of $r.\cos \theta.\dot{\phi}$ is, fed to an integrator 243 which includes a correcting device designed to utilise the output measuring $r$ from integrating device 141 and the output measuring $\cos \theta$ from computer 271 to make it integrate in effect $\dot{\phi}$ instead of $r.\cos \theta.\dot{\phi}$ and thus to produce an output proportional to the longitude angle $\phi$. This output operates the indicator 52, which may initially be set to the initial longitude angle of the craft and will thereafter indicate any change of that angle. In addition to providing an output proportional to the integral of $\dot{\phi}$, integrator 243 through the operation of its correcting device also provides an output proportional to $\dot{\phi}$. The quantity proportional to $\dot{\phi}$ is fed as an input to a computer 245 which operates firstly to multiply this quantity by a quantity measuring $\sin \theta$ derived in computer 271 and to add the resulting quantity measuring $\sin \theta.\dot{\phi}$ to a quantity representing $\sin \theta.\Omega$ derived in computer 272, thus producing an output measuring $\sin \theta(\dot{\phi}+\Omega)$. It will be seen from equations F that this is the value of $\omega_1$ which is required for application to the correcting devices in accelerometers 201 and 301. Computer 245 operates secondly to multiply the input quantity proportional to $\dot{\phi}$ by a quantity measuring $\cos \theta$ derived in computer 271 and to add the resulting quantity measuring $\cos \theta.\dot{\phi}$ to a quantity representing $\cos \theta.\Omega$ derived in computer 272, thus producing an output measuring $\cos \theta(\dot{\phi}+\Omega)$. As will be seen from equations F, this is the value of $\omega_2$ which is to be fed back to the correcting devices in accelerometers 101 and 201.

Figure 3:
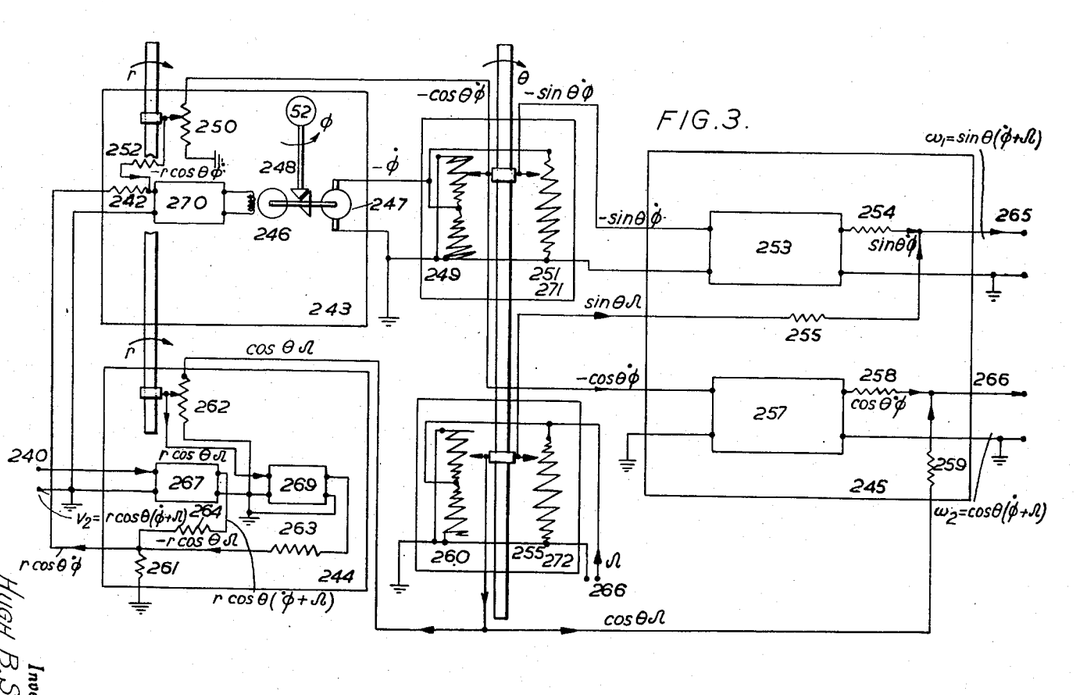
Fig. 3 is a simplified schematic and block diagram of an integrator used in the computer of Fig. 2.

A preferred form of the integrating device 241 is shown in Fig. 3. The principle of operation of integrating devices 141 and 341 is similar, but the devices are simpler than that shown in Fig. 3, since as has been stated, the operation of the integrating device 241 has to be corrected by two correcting factors proportional to $r$ and to $\cos \theta$ respectively, whereas, in the case of device 141, no correction is required, and in the case of device 341 only one correcting factor, $r$, is required.

A voltage representing $v_2 = r.\cos \theta(\dot{\phi}+\Omega)$ is fed from the output of integrating devices 231 to terminals 240 and thence to computer 244 in which it is applied to the input terminals of a linear D.C. amplifier 267. Across the output terminals of this amplifier are connected a high-resistance resistor 264 and a low-resistance resistor 261 in series. A quantity representing the constant $\Omega$ (the angular velocity of the earth about its polar axis) is fed to a potentiometer 260 which is controlled by a shaft coupled to the motor that operates indicator 53 and whose rotation is proportional to $\theta$. Potentiometer 260 is of special construction being designed so that the voltage on its slider is proportional to the input voltage multiplied by the angle represented by the rotation of its control shaft. The voltage on the slider of this potentiometer, which will be proportional to $\cos\theta.\Omega$, is fed to a further potentiometer 262 which is controlled by a shaft coupled to the motor that is driven by the output of integrating device 141 and whose rotation is proportional to $r$. Potentiometer 262 is constructed so that the voltage on its slider is a linear function of the angle turned through by its controlled shaft. The voltage on the slider of this potentiometer is thus proportional to $r.\cos\theta.\Omega$. This voltage is fed to the input terminals of amplifier 269 which operates to produce at its output terminals a voltage which is proportional to $-r.\cos\theta.\Omega$. Across these output terminals are connected high-resistance resistor 263 and low-resistance resistor 261 in series. Thus the current through resistor 261, and consequently the voltage across it, is substantially proportional to $r.\cos\theta.\dot\phi$. The voltage across resistor 261 is fed through resistor 242 to the input terminals of D.C. amplifier 270. This is a high-gain amplifier with negative feed-back and is preferably compensated for drift effects in the manner disclosed in co-pending U.S. application Ser. No. 130,328, now Patent No. 1,730,573. Whatever type of amplifier is used its input impedance must be kept low so that it may be used as a D.C. mixer amplifier. The output of the amplifier 270 is applied to a motor 246, which it drives at a speed dependent on the total input voltage to the amplifier. Motor 246 drives a D.C. generator 247 which produces a voltage proportional to the speed of the motor. A fraction of this voltage is fed back to the input terminals of the amplifier 270 in such a sense as to oppose the input voltage measuring $r.\cos\theta.\dot\phi$. The fraction of the generator voltage that is fed back is determined by the settings of two potentiometers 249 and 250 which are controlled by shafts coupled to the motors that operate indicators 51 and 53 respectively, and whose rotations are proportional to $r$ and to $\theta$ respectively. Potentiometer 249 is of similar construction to potentiometer 260 described above being designed so that its output voltage is proportional to the input voltage multiplied by the cosine of the angle represented by the rotation of its control shaft. Thus, the feed-back voltage is proportional to the product of the speed of the generator 247, of $r$, and of $\cos\theta$. Since the feed-back amplifier 270 operates substantially to equate the input voltage which is proportional to $r\dot\phi\cos\theta$ and the feed-back voltage, it follows that the speed of generator 247 is maintained substantially proportional to $\dot\phi$. A shaft 248 is also coupled to motor 246 so that its speed is therefore also proportional to $\dot\phi$ and consequently the angle through which it rotates is proportional to $\phi$. This shaft drives indicator 52. Consequently, if this indicator is initially set to the initial longitude angle of the craft when the apparatus is set in motion, it will continue subsequently to show the correct longitude $\phi$ of the craft during operation of the system.

As explained with reference to Fig. 2, integrator 241 operates to produce two further outputs, viz. $\omega_1$ and $\omega_3$, which are respectively equal to $\sin\theta(\dot\phi+\Omega)$ and to $\cos\theta(\dot\phi+\Omega)$. In order to produce the quantity measuring $\omega_1$, a voltage representative of the quantity $-\sin\theta.\dot\phi$ is obtained from the output of generator 247 by means of a potentiometer 251. This potentiometer is of special construction and is designed to produce an output voltage proportional to the sine of an angle represented by the rotation of its control shaft multiplied by its input voltage. The control shaft of the potentiometer 251 is driven by the shaft that operates indicator 53 so that its displacement is proportional to the latitude angle $\theta$.

Thus, as the output of generator 247 is proportional to $-\dot\phi$, the voltage on the slider of potentiometer 251 is proportional to $-\sin\theta.\dot\phi$. This voltage is applied to the input terminals of a linear D.C. amplifier 253, the output of which is of opposite sense to its input, so that a quantity proportional to $\sin\theta.\dot\phi$ is fed through resistor 254 to terminals 265. The voltage representing $\Omega$ from source 266 is applied in computer 272 to a potentiometer 255, similar to potentiometer 251 in computer 271, and having its control shaft operated in the same way from the output of integrator 341, so that the voltage on its slider is proportional to $\sin\theta.\Omega$. This voltage is fed to terminals 265 through resistor 255 so that, if a low-impedance load is connected across these terminals, the current flowing through the load will be substantially proportional to $\sin\theta(\dot\phi+\Omega)$. The load actually connected across these terminals is constituted by the correcting coils 222 and 321 in accelerometers 201 and 301 (Fig. 1).

To produce the modifying quantity $\omega_3$, which is equal to $\cos\theta(\dot\phi+\Omega)$, the voltage on the slider of potentiometer 249, which is proportional to $-\cos\theta.\dot\phi$, as explained above, is fed to the input terminals of linear D.C. amplifier 257. The output of this amplifier is of opposite sense to its input so that a voltage proportional to $\cos\theta.\dot\phi$ is fed to terminals 266 through resistor 258. The voltage on the slider of potentiometer 260, which is proportional to $\cos\theta.\Omega$, is also fed to terminals 266 through a resistor 259, so that, when the low-impedance load constituted by the correcting coils 122 and 222 in accelerometers 101 and 201 (Fig. 1), is connected across these terminals, the current flowing through the coils is substantially proportional to $\cos\theta(\dot\phi+\Omega)$.

Figure 4:
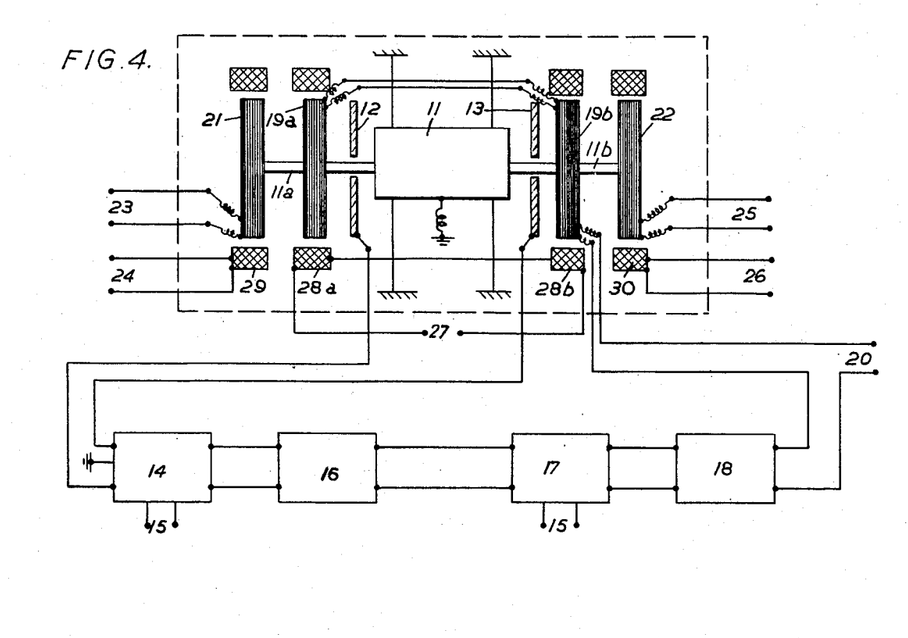
Fig. 4 is a diagrammatic drawing and block diagram of an accelerometer suitable for use in apparatus according to the invention.

An accelerometer suitable for use as any of the accelerometers 101, 201, 301 is shown in Fig. 4. This accelerometer is of the type more fully described in co-pending U.S. aplication Ser. No. 220,496, now Patent No. 2,888,256, and is so designed that the desired modifying quantities may be applied to it. It comprises essentially a movable element 11 mounted in a supporting casing by means of a resilient suspension so that it has substantially only one degree of freedom of movement along the direction of the axes of shafts 11$a$ and 11$b$ which extend from it in opposite directions. This movable element forms the moving plate of a differential capacitor having fixed plates 12 and 13, which forms part of an impedance bridge 14 energized by an alternating current source 15. The output of this bridge has an amplitude proportional to any displacement of the movable element 11 from its position of rest and a phase-sense relative to source 15 dependent on the sense of such displacement. This output after amplification in amplifier 16 is fed to a phase-sense sensitive rectifier 17 which provides a D.C. signal indicative in magnitude and polarity of the magnitude and sense of any displacement of the movable element 11. This signal is amplified in D.C. amplifier 18 and fed to coils 19$a$ and 19$b$ mounted on the shafts 11$a$ and 11$b$ respectively and located in air gaps in a magnetic field system produced by a double electro-magnet energised by coils 28$a$ and 28$b$, which are supplied with direct current from a source 27. Alternatively this electro-magnet may be replaced by a double permanent magnet. When the coils 19$a$ and 19$b$ are energised from the output of amplifier 18, they provide a force on the element 11 tending to restore it to the position in which the impedance bridge 14 is balanced. The output from amplifier 18 also appears at the output terminals 20 and is a measure of the force imparted to the element 11 by the current in coils 19$a$ and 19$b$ to keep the element central against the action of external forces or to counter the effects on the element of acceleration of the craft. Therefore, if no modifying forces are exerted the output at terminals 20 measures the acceleration of the craft along the axis of the accelerometer. To enable the modifying quantities to be fed to the accelerometer so that the signal at the output terminals 20 is a measure not of the true accelerations $\alpha_1$, $\alpha_2$, $\alpha_3$, but of the acceleration as modified in accordance with the principles of the present invention, two further coils 21 and 22 are mounted on the movable element 11, one on shaft 11a and the other on shaft 11b so as to be within the electro-magnetic fields produced respectively by coils 29 and 30 fixed to the casing of the accelerometer. Each pair of coils 21, 29 and 22, 30 provides a force on the movable element which is proportional to the product of the currents flowing in the coils not only in magnitude but also in sign. Terminals 23, 24, 25 and 26 are provided for supplying the currents to coils 21, 29, 22 and 30 respectively.

As has already been stated, the method of maintaining the accelerometers in the correct relation to the local co-ordinate axes is not, per se, part of the present invention, but it may involve the use of a gyroscopic system of stabilisation as set out in the specification of co-pending U.S. application Ser. No. 225,937. In this system the quantities $\omega_1$, $\omega_2$, $\omega_3$, produced as described above, are used to control the gyroscopes that stabilise the accelerometers to keep them, and therefore the accelerometers, very accurately parallel to the local co-ordinate axes.

A modified form of the invention operating in the same co-ordinate system $r$, $\phi$, $\theta$ may be realised by utilising barometric or similar devices to determine the height of the craft, thereby determining the co-ordinate $r$, and to determine the rate of change of height, $\dot{r}$, instead of using the vertical accelerometer 101 and the integrators 131 and 141 as described above. In some cases also it may be that changes in the co-ordinate $r$ are sufficiently small for this co-ordinate to be considered a constant equal to R, the radius of the earth, more particularly in computing the correcting terms applied to the horizontal accelerometers, since the corrections applied are in general a very small fraction of the total acceleration measured so that small percentage errors in the corrections are not important in the total result. In this case considerable simplification of the apparatus may be effected, since no correcting quantity then has to be applied to integrator 342 and only one correcting quantity namely, $\cos \theta$ has to be applied to integrator 243.

More generally, it will be appreciated that certain of the terms used to modify the output of the accelerometers may be considerably smaller in magnitude than the others depending on the factors that determine what component velocities the craft may attain at different parts of its journey and also on what values of the co-ordinates may be attained, e.g. in what latitude the craft may be travelling, and also, to some extent, on the total duration of the journey. It may be, therefore, that in some forms of the invention for certain prescribed conditions defining the manner of travel of the craft and for certain prescribed accuracy requirements for the system, if will be found possible to dispense with the use of some of the modifying terms. The invention is to be regarded as including systems in which integration of measures of acceleration are effected to derive measures of velocity and in which not all of the modifying terms described herein are used, so long as at least one term modifying the output from an accelerometer before that output is applied to an integrator is used in accordance with the principles herein set out.

I claim:

1. In a navigation system for computing components of the velocity of a moving craft in the direction of the axes of a local coordinate system located at the craft and moving therewith, said axes being respectively continuously directed in those directions in which the co-ordinates of a predetermined main coordinate system fixed in the earth will change most rapidly at the position of the craft, an accelerometer positioned to generate signal from the component of acceleration of the craft along a first of the local coordinate axes, means for producing a signal proportional to the component of the craft's velocity in the direction of a second of the local coordinate axes, means for producing a signal proportional to the component of angular velocity of the local coordinate system about the third of said local coordinate axes, and means for correcting the signal proportional to the acceleration of the craft along said first axis in accordance with both of the other signals.

2. A system of the character recited in claim 1 in which means are provided for controlling the accelerometer in accordance with both of the correcting signals.

3. In a navigation system for computing components of the velocity of a moving craft in the direction of the axes of a local coordinate system located at the craft and moving therewith, said axes being respectively continuously directed in those directions in which the coordinates of a predetermined main coordinate system fixed in the earth will change most rapidly at the position of the craft, a plurality of accelerometers positioned to generate signals from acceleration of the craft along at least two of the local coordinate axes, a plurality of integrating means respectively connected to receive the outputs of said accelerometers and for providing signals proportional to components of the craft's velocity along the respective axes, means including computing means for producing signals proportional to the components of accelerations of the craft along said two axes due to rotation of the local coordinate axes in space, and means for correcting the outputs of said accelerometers respectively in accordance with the respective outputs of said computing means.

4. A system of the character recited in claim 3 in which the plurality of accelerometers comprises three accelerometers respectively positioned to generate signals from accelerations along the mutually perpendicular axes of the local coordinate system and in which the local coordinate axes are so disposed that one accelerometer generates signals from accelerations along the radius of the earth to the local coordinate system and the other accelerometers are positioned to generate signals from accelerations in mutually perpendicular directions normal to the direction of the earth's radius.

5. In a navigation system for computing components of the velocity of a moving craft in the direction of the axes of a local coordinate system located at the craft and moving therewith, said axes being respectively continuously directed in those directions in which the co-ordinates of a predetermined main coordinate system fixed in the earth will change most rapidly at the position of the craft, a pair of accelerometers positioned to generate signals from acceleration of the craft along two of the local coordinate axes, means for producing signals proportional to the components of the craft's velocity in the direction of a pair of the axes of the local coordinate system, means for generating signals proportional to the components of angular velocity of the local coordinate system about a pair of its axes, and means for respectively correcting each of the signals produced by acceleration of the craft along said pair of axes in accordance with signals of angular velocity of the system and signals of craft velocity about and along axes other than the one along which the acceleration signal being so corrected is generated.

6. A system of the character recited in claim 5 in which one axis lies in a vertical direction, another axis lies in substantially an east-west direction and the other axis lies in substantially a north-south direction.

7. In a navigation system for computing components of the velocity of a moving craft in the direction of the axes of a local coordinate system located at the craft and moving therewith, said axes being respectively continuously directed in those directions in which the coordinates of a predetermined main coordinate system fixed in the earth will change most rapidly at the position of the craft, a plurality of accelerometers positioned to generate signals from the components of accelerations of the craft along the three axes of the local coordinate system, a plurality of integrating means respectively connected to receive the outputs of said accelerometers and for providing signals proportional to the components of the craft's velocity along the respective axes, computing means responsive to the outputs of said integrating means for respectively supplying outputs proportional to the angular velocity of the local coordinate system about an axis thereof, and means for applying the outputs of said computing means respectively and the outputs of said integrating means in correcting relation to said accelerometers such that the outputs employed to correct any one of said accelerometers are proportional to angular velocity about and craft's velocity along the two axes other than that along which acceleration signals are generated by that accelerometer.

References Cited in the file of this patent

UNITED STATES PATENTS

| | | |
|---|---|---|
| 1,386,953 | Robertson | Aug. 9, 1921 |
| 1,728,904 | Herr | Sept. 17, 1929 |
| 1,741,713 | Holmes | Dec. 31, 1929 |
| 1,765,583 | Henderson | June 24, 1930 |
| 2,109,283 | Boykow | Feb. 22, 1938 |
| 2,251,155 | Neuhans | July 29, 1941 |
| 2,266,449 | Ullrich et al. | Dec. 16, 1941 |